BIT RING COUNTER WITH BIT MARKER

Filed May 16, 1966 3 Sheets-Sheet 1

INVENTOR.
MICHAEL SHERMAN
BY Joseph R. Dwyer
ATTORNEY

INVENTOR.
MICHAEL SHERMAN
BY Joseph R. Dwyer
ATTORNEY

BIT RING COUNTER WITH BIT MARKER

Filed May 16, 1966

INVENTOR.
MICHAEL SHERMAN
BY Joseph R. Dwyer
ATTORNEY

United States Patent Office 3,469,110

Patented Sept. 23, 1969

3,469,110

BIT RING COUNTER WITH BIT MARKER

Michael Sherman, Granada Hills, Calif., assignor to Singer-General Precision, Inc., a corporation of Delaware Filed May 16, 1966, Ser. No. 550,550
Int. Cl. H03k 23/08
U.S. Cl. 307—223 2 Claims

ABSTRACT OF THE DISCLOSURE

A ring counter especially useful for sequentially writing into core memory devices where power consumption is of importance. In the counter, only one bit stage at a time is in a very low current standby condition until an input signal pulse switches that stage to produce a high current output pulse. Termination of the high current pulse returns the stage to its zero ambient power consumption while enabling the next following stage into its standby condition.

This invention relates to an electronic bit counter, and more particularly to an electronic bit ring counter for operation with electronic computing memory devices or the like for indicating selection times in which logical functions are permitted to be performed in magnetic memory matrices or the like.

In practice, bit counters of this particular class are used to provide drive currents to memory matrices in a sequential order. Thus, such counters have a plurality of outputs which are sequentially enabled until the last output is enabled, whereupon the initial output is again enabled.

This invention provides a circuit wherein very little stand-by power is needed and more power is available for drive operation on an output selection drive when a command signal is received. Thus, it can be said that the bit counter gains power when operated upon and thereby provides more drive power to its outputs.

A trigger to a bit counter of this particular type does not come at certain intervals. Thus, at stand-by periods, a large amount of power is not needed and if available, would only be wasted. By this invention the stand-by power is low and will gain when the bit counter is operated upon. Means are also provided in this particular embodiment to clear the counter for a restart back to its initial count.

Briefly described, the present invention provides an improved bit ring counter comprising a plurality of bit stages; each bit stage is sequentially coupled to a further bit stage and the last bit stage is coupled back into the first bit stage. The bit counter of the present invention is a shift register connected in a ring and at the initial start, only one stage is turned on to a low-conduction, low-power dissipation stand-by state ready to enter to a high-powered operating loop when triggered at the input. Upon receipt of an operating command pulse at the initial input, the drive current goes to a high level and is available to outputs such as digit lines of a memory matrix, or the like, during a drive cycle. Further, this invention may provide an output marker pulse during the write cycles. The marker pulse is generated in coincidence with the word timing. At the termination of each shift and operate command, the bit counter is advanced one bit. The counter will clear and set to bit one every time a clear pulse is applied.

It, therefore, becomes one object of this invention to provide a novel and improved bit counter which makes available high current output signals to selected inputs of a memory matrix or the like.

Another object of this invention is to provide a novel and improved bit counter which is automatically and sequentially shifted to set the next upcoming bit upon the termination of the preceding shift and operate command signal.

Another object of this invention is to provide a bit counter that generates a bit marker to indicate when a certain selection drive output is activated.

Another object of this invention is to provide a bit counter with a clear input to reset the counter to its initial start.

Another object of this invention is to provide a bit counter that operates on a low stand-by power until an operate and shift command input is introduced, whereupon it makes available a higher level current at the sequentially selected bit stages.

These and other objects will become apparent when taken into consideration with the following detailed description in which the following figures illustrate preferred embodiments of this invention, and wherein like reference numerals indicate like or corresponding parts throughout the several views, and wherein.

Figure 1:
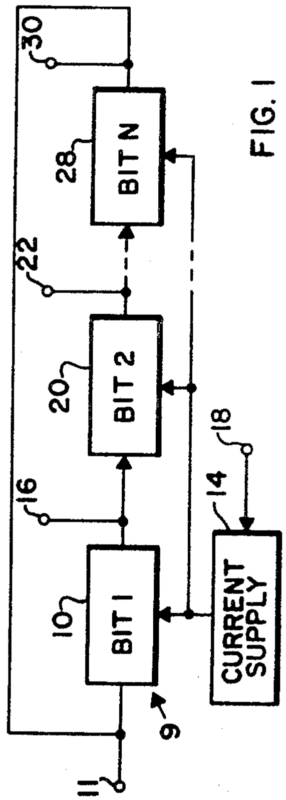
FIGURE 1 is a block diagram illustrating one embodiment of this invention.

Turning now to a more detailed description of this invention, there is shown in FIGURE 1 a bit counter 9 which comprises a plurality of bit stages to the *n*th bit, wherein the first bit stage 10 is coupled directly to a second bit stage 20 and the second bit stage is coupled to a third and fourth, etc., until finally coupled to the *n*th bit-stage 28 which is in turn coupled back into the first bit stage 10. A current supply 14 is coupled into bit stage 10 as well as bit stage 20 and all bit stages including bit stage 28. An output terminal 16 is coupled between the bit stage 10 and bit stage 20 on the output of bit stage 10 and may, for example, provide output current to outside sources when coupled across a load or the like. An output terminal 22 is coupled from the output of bit stage 20 and also provides current to load and is available when acted upon, and finally, an output terminal 30, coupled to an output of the *n*th bit of bit stage 28. A shift and operate command may be introduced to input terminal 18 for operation on this invention.

Figure 2:
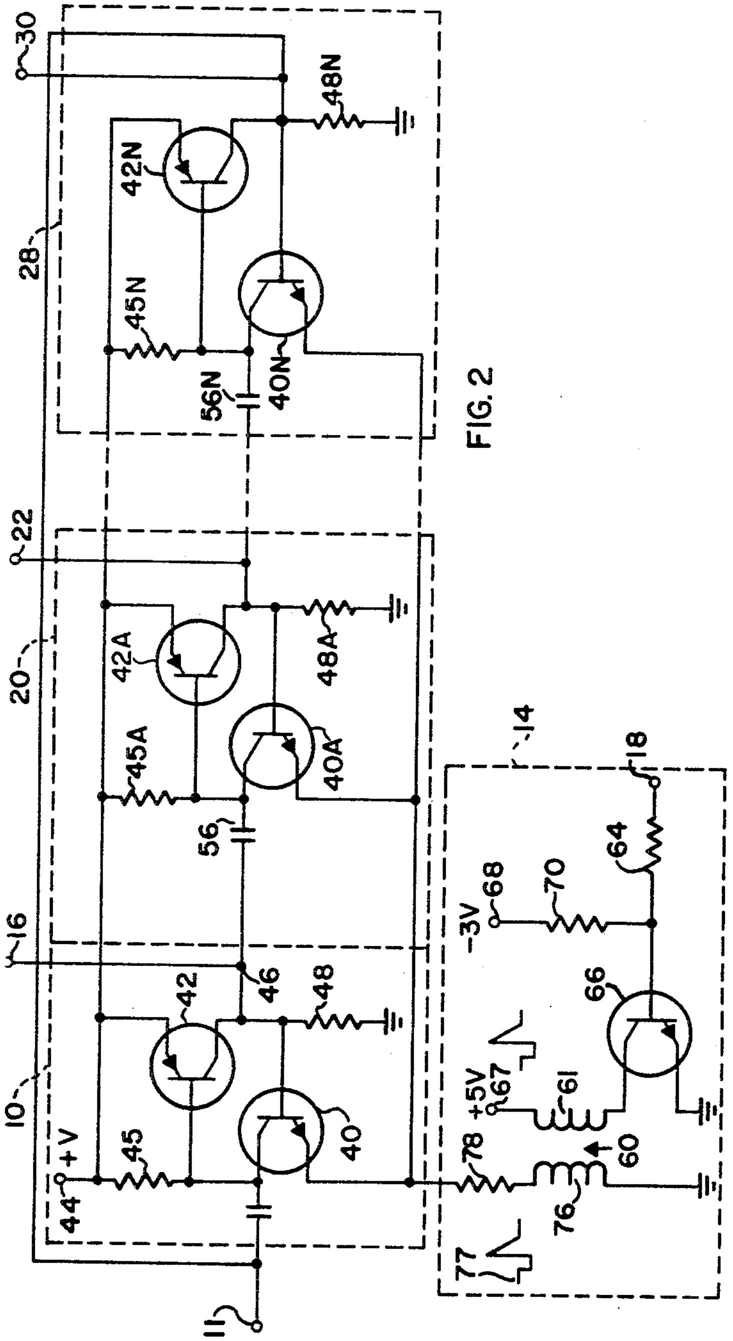
FIGURE 2 is an electrical schematic drawing of the embodiment of this invention shown in FIGURE 1.

The block diagram shown in FIGURE 1 may contain circuitry for example, as shown in FIGURE 2, wherein bit stage 10 includes a transistor 40, which has an emitter coupled to the current supply 14, which will be explained later. The collector of transistor 40 is coupled to the base of transistor 42. Transistor 40 may, for example, be of the NPN type, and transistor 42 may be of the PNP type. The base of transistor 40 is coupled directly to the collector of transistor 42 and to a ground potential through a resistor 48. The collector of transistor 40 and the base of transistor 42 are coupled to a voltage source on terminal 44 through a resistor 45. For this example, the voltage at terminal 44 will be at least +5 volts. Bit stage 10 is coupled directly into a similar bit stage 20. The output of bit stage 10 emanates from the collector of transistor 42 and the base of transistor 40 through a capacitor 56 which is coupled in series betwen the output of bit stage 10 and the input of bit stage 20. Capacitor 56 is coupled to the collector of transistor 40A which has its emitter coupled to current supply 14, and its collector coupled to the base of transistor 42A. The base of transistor 42A and the collector of transistor 40A are coupled through a resistor 45A to the voltage source at terminal 44. The base of transistor 40A and the collector of transistor 42A are coupled to a ground reference through a resistor 48A. All bit stages are the same and at the final stage 28 a capacitor 56N is coupled to the base of transistor 40A and the collector of transistor 42A, and in series with the input of bit stage 28 wherein it is coupled to the collector of transistor 40N. The emitter of transistor 40N is coupled to the output of the current supply 14. The base of transistor 40N is coupled to the collector of transistor 42N, and the base of transistor 42N is coupled to the collector of transistor 40N and to the voltage source terminal 44 through the resistor 45N. The collector of transistor 42N and the base of transistor 40N are coupled to a ground reference through the resistor 48N and are also connected back into the input of the first stage 10.

The current supply 14 includes a transformer 60 which has a primary winding 61 which is coupled to the input terminal 18 through a resistor 64 and a transistor 66. The transistor 66 is in the form of a switch which has its emitter coupled to the ground reference, and its collector coupled to one end of the primary winding 61 of the transformer 60. The opposite end of primary winding 61 is coupled to a terminal 67 which may have, for example, a positive voltage of 5 volts applied thereto. The transistor 66 has its base coupled to a terminal 68 through a resistor 70. Terminal 68 may have a −3 volts applied thereto. The purpose of the −3 volts and the resistor 70 is to clamp the transistor 66 in a permanently off condition until a less negative shift command signal is applied to the terminal 18. Secondary winding 76 of transformer 60 is coupled to the emitter electrodes of the transistor 40 to 40N through a resistor 78, which has a resistance that is sufficient to provide the low stand-by current through the primary winding 76 to ground.

Figure 5:
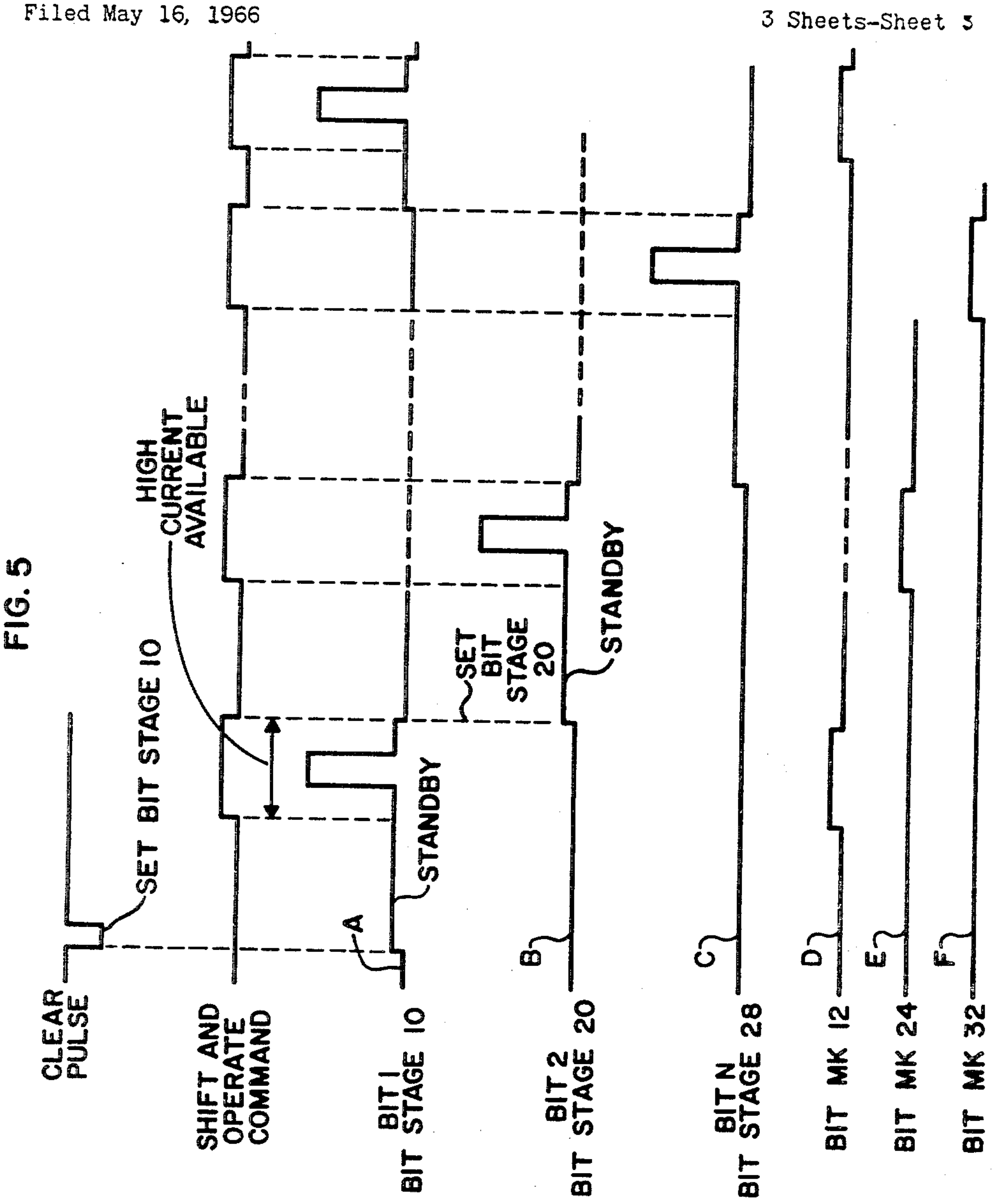
FIGURE 5 is a graphical illustration of timing diagrams and output signals.

For initially setting the first bit stage 10 of the bit counter 9, a clear and set pulse is applied to the terminal 11. Such a signal is shown in FIGURE 5. It may be of a short duration. Transistor 42 is then turned on, which in turn supplies base current to transistor 40, turning it on. The emitter of transistor 40 then swings to ground through resistor 78 and secondary winding 76 of transformer 76, thus placing bit stage 10 to the low standby position as shown in graph A, FIGURE 5. Transistors 40 and 42 are then clamped to ground and remain there when the clear and set pulse is removed from the terminal 11. Bit stage 10 is then set in a ready standby as shown in graph A, FIGURE 5, with both transistors 40 and 42 turned on in a low-current state. Thus, bit stage 10 is set. If a shift and operate command is applied to terminal 18 of the current supply 14, transistor 66 will be turned on. The current through primary winding 61 of transformer 60 will induce a negative voltage pulse through the winding 76 of transformer 60 as shown by the graph 77. The IR drop across resistor 78 will increase because of the lowered voltage and the resulting increased current flow through transistor 40 will further enable transistor 42 to make more current available at the junction 46 between the collector of transistor 42 and the base of transistor 40. Only during this shift and operate command time will the high current be available on terminal 16 of bit stage 10. Thus, if a load is introduced at output terminal 16, the higher current will be available for operating logical functions to external equipment.

Upon the termination of a shift and operate command signal shown in FIGURE 5, an output spike is naturally generated by the transformer 60 as shown by the positive spike following the negative pulse of the graph 77. This positive spike applied to the emitter of transistor 40 will turn transistor 40 off which in turn will turn off transistor 42, dropping the level to zero at bit stage output terminals 16.

Upon the termination of the signal on the output terminal 16, the RC time constant circuit formed by resistor 45A and the capacitor 56 produces a signal capable of driving the base of transistor 42A negative and setting the second stage 20 of bit counter 9 to the stand-by status as shown in FIGURE 5, graph B, at which time transistor 40A is allowed to turn on and await the next shift and operate command on terminal 18. The same steps continue throughout each stage in the plurality of bit stages until bit stage 28 of bit $n$ finally resets bit 1 on bit stage 10 by each shift and operate command presented to terminal 18 of the current supply 14.

Figures 3, 4:
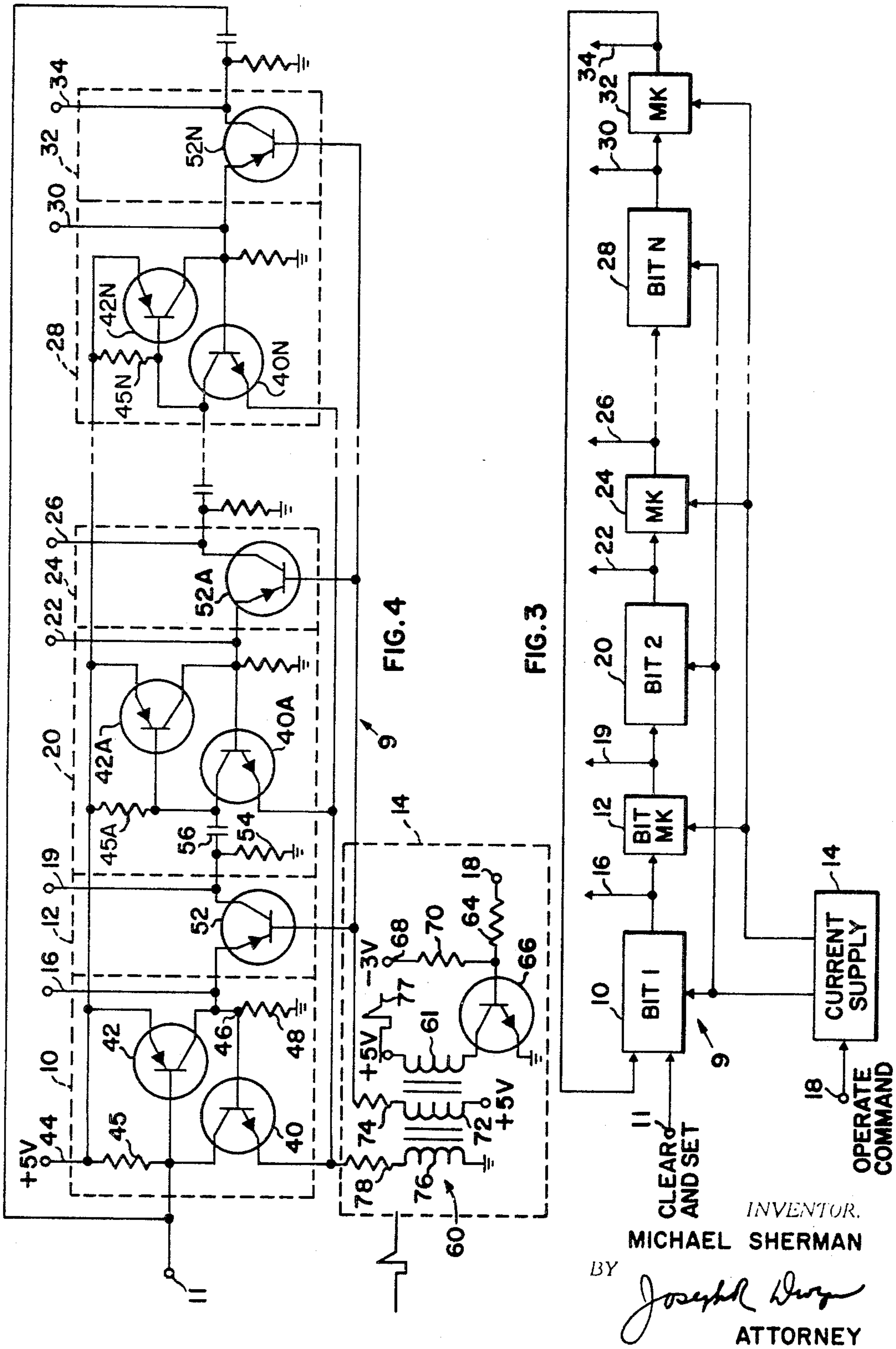
FIGURE 3 is a block diagram illustrating another embodiment of this invention.
FIGURE 4 is an electrical schematic drawing of the embodiment shown in FIGURE 3.

Referring now to FIGURES 3 and 4 concurrently, which illustrate a second embodiment of this invention wherein the bit counter 9 comprises a plurality of bit stages to the $n$th bit wherein a first bit stage 10 is coupled to a bit marker 12. Bit stage 10 receives the clear and set pulse at terminal 11 which sets the bit counter 9 to an initial start time. Current supply 14 provides the low standby current as previously explained with connection of FIGURES 1 and 2.

Bit stage 10 has its output coupled directly into the bit marker 12. The bit marker 12 provides the output on output terminal 19 which coincides with the operated shift command signal applied to the terminal 18. Bit stage 20 is coupled to bit marker 24 and bit marker 24 provides the output on terminal 26 which coincides with the shift and operate command applied to terminal 18. The same is true with all bit stages provided in the bit counter 9 until bit $n$ of bit stage 28 is attained which has the bit marker 32 coupled to the output thereof and provides an output signal on terminal 34 which coincides with the shift and operate command applied to terminal 18.

The schematic drawings shown in FIGURE 4 show that the transformer 60 has a second secondary winding 72 which is coupled to a resistor 74 and the other end of the resistor 74 is coupled to the bit markers 12, 24, and 32.

All bit markers are identical and bit marker 12, for example, comprises a transistor 52 which may be of the PNP type and has its emitter coupled to the junction 46 of bit stage 10 which is coupled directly to the collector of transistor 42 and the base of transistor 40. The collector of transistor 52 is coupled to an output terminal 19 and also coupled to the input of bit stage 20 through the capacitor 56 and to the base of transistor 42A and the collector of transistor 40A.

When the shift and operate command is applied to terminal 18, an output signal is also provided through the secondary winding 72 of transformer 60 and provides a current through the resistor 74 to all of the base electrodes of all bit markers in the bit counter 9, but the only bit marker that turns on will be the one which has current available to the emitter electrode of transistor 52.

FIGURE 5 shows that when bit marker 12 is enabled it provides an output signal on terminal 19 that coincides with the shift and operate command for that particular bit stage. Bit marker 24 provides a signal as shown in FIGURE 5, Graph E, that coincides with the shift and operate command for that particular bit stage and finally bit marker 32 has a signal on its terminal 34 as shown in Graph F of FIGURE 5 that coincides with the shift and operate command applied to bit stage 28.

Having thus described what are considered as preferred embodiments of this invention, what is claimed is:

1. A bit counter for operation requiring low standby currents and high output currents upon command, said counter comprising:

a plurality of bit stages operating in a ring configuration, each of said stages including a first transistor for controlling the current output of its respective stage and a second transistor for controlling the conduction of said first transistor;

current supply circuitry coupled to the second transistor of each of said stages, said circuitry including a transformer winding in series with the second transistors in said plurality of stages;

first input means coupled to said second transistor in one of said stages for receiving a signal which initiates standby conduction of said second transistor through the transformer winding in said current supply circuitry; and second input means coupled to said current supply circuit for applying a first polarity pulse to said transformer winding for increasing conduction of said second transistor and the current output of said first transistor and, upon completion of said first polarity pulse, a second polarity pulse for terminating conduction of said first and second transistors and for initiating standby conduction of the second transistor in the next following stage.

2. The bit counter, claimed in claim 1 further including a bit marker interposed between the output of a first stage and the input of the next following stage, said bit marker coupled to a second transformer winding in said current supply circuitry for producing an output signal and for enabling the next following stage only upon coincidence of a pulse generated by said second transformer winding with an output signal generated by said first stage.

References Cited

UNITED STATES PATENTS

| | | | |
|---|---|---|---|
| 3,021,450 | 2/1962 | Jiu | 315—84.5 |
| 3,121,810 | 2/1964 | Horna | 307—88.5 |
| 3,134,031 | 5/1964 | Fennick et al. | 307—88.5 |
| 3,158,781 | 11/1964 | Howell | 315—84.5 |
| 3,290,515 | 12/1966 | Procter | 307—88.5 |
| 3,309,537 | 3/1967 | Archer | 307—88.5 |
| 3,368,083 | 2/1968 | Dowding et al. | 307—221 |

ARTHUR GAUSS, Primary Examiner

S. D. MILLER, Assistant Examiner

U.S. Cl. X.R.

307—288, 296